(12) United States Patent
Sato et al.

(10) Patent No.: US 8,362,158 B2
(45) Date of Patent: Jan. 29, 2013

(54) POLYGLYCOLIC ACID RESIN COMPOSITION

(75) Inventors: Hiroyuki Sato, Iwaki (JP); Fumio Akutsu, Iwaki (JP); Fuminori Kobayashi, Iwaki (JP)

(73) Assignee: Kureha Corporation, Tokyo (JP)

(*) Notice: Subject to any disclaimer, the term of this patent is extended or adjusted under 35 U.S.C. 154(b) by 280 days.

(21) Appl. No.: 12/085,566

(22) PCT Filed: Nov. 30, 2006

(86) PCT No.: PCT/JP2006/323937
§ 371 (c)(1),
(2), (4) Date: May 28, 2008

(87) PCT Pub. No.: WO2007/063941
PCT Pub. Date: Jun. 7, 2007

(65) Prior Publication Data
US 2009/0171039 A1    Jul. 2, 2009

(30) Foreign Application Priority Data
Dec. 2, 2005 (JP) ................................ 2005-349812

(51) Int. Cl.
*C08G 63/08*    (2006.01)
(52) U.S. Cl. .................... 525/450; 525/410; 525/418
(58) Field of Classification Search ............ 525/410, 525/418, 450
See application file for complete search history.

(56) References Cited

U.S. PATENT DOCUMENTS

| 3,884,874 A * | 5/1975 | Rosenberger et al. ........ 524/191 |
| 4,529,779 A | 7/1985 | Arai et al. |
| 2003/0125508 A1 * | 7/2003 | Yamane et al. ............... 528/354 |
| 2006/0100392 A1 | 5/2006 | Yamane et al. |
| 2007/0073032 A1 * | 3/2007 | Sato et al. .................... 528/272 |
| 2007/0244293 A1 * | 10/2007 | Sato et al. .................... 528/272 |

FOREIGN PATENT DOCUMENTS

| EP | 1 616 908 A1 | 3/2004 |
| EP | 1449864 | 8/2004 |
| JP | 09-124778 | 10/1995 |
| JP | 10-176038 | 4/1997 |
| JP | 2001-261797 | 3/2000 |
| JP | 2001-261797 | * 9/2001 |
| JP | 2003-321602 | 1/2003 |
| WO | WO 2004/087813 A1 | 3/2004 |
| WO | WO 2005/090438 A1 | 3/2005 |
| WO | 2005-035623 | 4/2005 |
| WO | 2005/035623 | * 4/2005 |
| WO | 2005044894 | 5/2005 |
| WO | 2005/090438 | * 9/2005 |
| WO | WO 2006/104092 A1 | 3/2006 |
| WO | 2007060981 | 5/2007 |

OTHER PUBLICATIONS

Huffman et al., Journal of Polymer Science: Polymer Chemistry Edition, vol. 23, 1939-1954 (1985).*
Chu, Journal of Applied Polymer Science, vol. 26, 1727-1734 (1981).*
International Search Report of PCT/JP2006/323937 mailed Feb. 20, 2007.
International Preliminary Report on Patentability for PCT/JP2006/323937 dated Jun. 3, 2008.
Extended European Search Report for corresponding International Application PCT/JP2006/323937, Aug. 17, 2010.

* cited by examiner

*Primary Examiner* — Robert C Boyle
(74) *Attorney, Agent, or Firm* — Wenderoth, Lind & Ponack, L.L.P.

(57) ABSTRACT

A polyglycolic acid resin composition having improved moisture resistance is obtained by adding a carboxyl group-capping agent and a polymerization catalyst-deactivation agent to a polyglycolic acid resin.

10 Claims, No Drawings

POLYGLYCOLIC ACID RESIN COMPOSITION

TECHNICAL FIELD

The present invention relates to a composition comprising principally a polyglycolic acid resin of which the resistance to hydrolysis (or moisture resistance) has been improved.

BACKGROUND ART

An aliphatic polyester, such as polyglycolic acid or polylactic acid, can be decomposed by microorganisms or enzymes present in nature, such as soil or sea water, and is therefore noted as a biodegradable polymer material giving little load to the environment. Further, an aliphatic polyester has degradability and absorbability in vivo, so that it is used also as a polymer material for medical use, such as sutures for surgery or artificial skin.

Among the aliphatic polyesters, polyglycolic acid is excellent in gas barrier properties, such as oxygen gas barrier property, carbon dioxide gas barrier property and water vapor barrier property, and also is excellent in heat resistance and mechanical properties, and therefore the development of new use thereof by itself or as a composite material together with another resin material, is under way.

However, aliphatic polyesters are generally hydrolyzable, and particularly polyglycolic acid resin has a remarkable tendency thereof and involves problems that its barrier property and strength are lowered along with its hydrolysis.

There have been individually known that the hydrolyzability of an aliphatic polyester inclusive of polyglycolic acid resin is related with a terminal carboxyl group concentration and the moisture resistance of an aliphatic polyester can be increased by adding a carboxyl group-capping agent (Patent document 1 listed below), and the hydrolyzability of polyglycolic acid resin is related with a residual glycolide content (Patent document 2 below). On the other, it has been also known that a resistance to thermal resistance of polylactic acid around its melting point can be increased by adding a polymerization catalyst-deactivation agent thereto (Patent document 3 below). However, there has not been known an influence of a carboxyl group-capping agent on a moisture resistance (more specifically, a resistance to decomposition with water under a lower temperature condition of e.g., around room temperature, or in a hydrolysis-promoting environment of, e.g., 50° C. and 90%-relative humidity) of polyglycolic acid resin.

Patent document 1: JP2001-261797A,
Patent document 2: WO2005/090438A,
Patent document 3: JP9-124778A,
Patent document 4: WO2007/060981A

DISCLOSURE OF INVENTION

Accordingly, a principal object of the present invention is to provide a polyglycolic acid resin composition with a further improved moisture resistance.

According to the present invention, there is provided a polyglycolic acid resin composition with an improved moisture resistance comprising a polyglycolic acid resin, and a carboxyl group-capping agent and a polymerization catalyst-deactivation agent added thereto.

A history through which the present inventors have arrived at the present invention as a result of a study with the above-mentioned object, will be briefly described.

The present inventors et al. studied the influence of terminal carboxyl group and residual glycolide on the moisture resistance of polyglycolic acid resin. As a result thereof, it has been found that residual glycolide in polyglycolic acid resin is decomposed into glycolic acid dimer and dissociated to function as a terminal carboxyl group concentration in a proportion of a little more than 60% thereof when it contacts water, and it has been found possible to control the moisture resistance of polyglycolic acid resin at a good accuracy by controlling a total carboxyl group concentration including a contribution of residual glycolide, whereby a method of controlling moisture resistance of polyglycolic acid resin has been proposed (Patent document 4 above).

However, as a result of the present inventors' further study of examining combinations of a carboxyl group-capping agent and various thermal stabilizers, it has been found that a combined system of a carboxyl group-capping agent and a polymerization catalyst-deactivation agent used as a thermal stabilizer, peculiarly provides a polyglycolic acid resin composition having a remarkably improved moisture resistance compared with its total carboxyl group concentration. More specifically, it has been found that the combined system obstructs the function of residual glycolide functioning as a carboxyl group source in the polyglycolic acid resin composition proposed in Patent document 4, so that the moisture resistance can be remarkably improved. The result is assumed to be attributable to deactivation of a residual polymerization catalyst by the polymerization catalyst-deactivation agent, resulting in suppression of hydrolysis of glycolide and thus depriving the glycolide of its function as a carboxyl group source. The polyglycolic acid resin composition of the present invention has been based on the knowledge of such a remarkable improvement of moisture resistance attained by a combined system of a polymerization catalyst-deactivation agent and a carboxyl group-capping agent for a polyglycolic acid resin containing residual glycolide.

BEST MODE FOR PRACTICING THE INVENTION (Polyglycolic Acid Resin)

The polyglycolic acid resin (hereinafter, sometimes referred to as "PGA resin") includes homopolymer of glycolic acid (PGA, inclusive of a ring-opening polymerization product of glycolide (GL) which is a bimolecular cyclic ester of glycolic acid) consisting only of glycolic acid recurring unit represented by a formula of —(O.CH$_2$.CO)— and also a glycolic acid copolymer containing at least 70 wt. % of the above-mentioned glycolic acid recurring unit.

Examples of comonomers for providing the polyglycolic acid copolymer together with the glycolic acid monomer such as glycolide, may include: cyclic monomers, inclusive of ethylene oxalate (i.e., 1,4-dioxane-2,3-dione); lactides; lactones, such as β-propiolactone, β-butyrolactone; pivalolactone, γ-butyrolactone, δ-valerolactone, β-methyl-δ-valerolactone, and ε-caprolactone; carbonates, such as trimethylene carbonate; ethers, such as 1,3-dioxane; ether-esters, such as dioxanone; and amides, such as ε-caprolactam; hydroxycarboxylic acids, such as lactic acid, 3-hydroxypropanoic acid, 4-hydroxybutanoic acid and 6-hydroxycaproic acid, and their alkyl esters; substantially equal molar mixtures of aliphatic diols, such as ethylene glycol and 1,4-butane diol with aliphatic dicarboxylic acids, such as succinic acid and adipic acid, and their alkyl or aromatic esters; and two or more species of these. These monomers may be replaced by polymers thereof which can be used as a starting material for providing a polyglycolic acid copolymer together with the above-mentioned glycolic acid monomer such as glycolide.

The above-mentioned glycolic acid recurring unit should occupy at least 70 wt. %, preferably at least 90 wt. %, of the PGA resin. If the content is too small, the strength or the gas-barrier property expected of PGA resin becomes scarce. As far as this is satisfied, the PGA resin can comprise two or more species of polyglycolic acid (co)polymers in combination.

The PGA resin may preferably have a molecular weight (Mw (weight-average molecular weight based on polymethyl methacrylate) of $3 \times 10^4 – 8 \times 10^5$, particularly $5 \times 10^4 – 5 \times 10^5$, as measured by GPC measurement using hexafluoroisopropanol solvent. If the molecular weight is too small, the resultant form product is liable to have an insufficient strength. On the other hand, too large a molecular weight is liable to result in difficulties in melt-extrusion, forming and processing.

For producing a polyglycolic acid resin as described above, it is preferred to adopt a process of ring-opening polymerization under heating of glycolide (i.e., cyclic dimer of glycolic acid). The ring-opening polymerization process is a substantially bulk-phase ring-opening polymerization process. The ring-opening polymerization is caused to proceed in the presence of a catalyst at a temperature of ordinarily at least 100° C. Even though the ill effect of residual glycolide causing a lowering in moisture resistance of PGA resin is reduced by using a polymerization catalyst-deactivation agent according to the present invention, it is generally preferred to reduce lo residual glycolide in PGA resin after the polymerization. For this purpose, it is preferred to proceed with at least a latter period of polymerization (preferably at a monomer conversion of at least 50%) at a regulated temperature of below 200° C., preferably 140-195° C., further preferably 160-190° C., so as to keep the system in a solid phase, and also subject the resultant polyglycolic acid to removal of residual glycolide by release to a gas phase, as disclosed in Patent document 2. As the catalyst, it is possible use one ordinarily used as a catalyst for ring-opening polymerization of various cyclic esters, specific examples of which may include: compounds, such as oxides, halides, carboxylic acid salts and alkoxides of metals, such as tin (Sn), titanium (Ti), aluminum (Al), antimony (Sb), zirconium (Zr), zinc (Zn) and germanium (Ge). More specifically preferred examples of the catalysts may include: tin compounds including tin halides (e.g., tin dichloride, tin tetrachloride) and tin organic-carboxylates (e.g., tin octanoates, such as tin 2-ethylhexanoate); titanium compounds, such as alkoxy-titanates; aluminum compounds, such as alkoxy-aluminums; zirconium compounds, such as zirconium acetylacetone; and antimony halides. Among these, tin compounds are particularly preferred in view of activity and combination with a polymerization catalyst-deactivation agent.

The amount of the catalyst may be small and ordinarily be selected from the range of 0.0001-0.5 wt. %, preferably 0.001-0.1 wt. %.

As has been proposed by the present inventors, et al. in WO2005/044894A, it is preferred to adopt a process of subjecting a cyclic ester containing proton-source compounds inclusive of water and alcohol as initiators and molecular weight-adjusting agents to ring-opening polymerization based on a total proton concentration and a ratio (carboxylic acid/ester mol ratio) between a mol concentration of carboxyl (carboxylic acid)-source compounds including water and a mol concentration of alkoxycarbonyl (ester)-source compounds including alcohol, as polymerization-controlling factors. More specifically, it is preferred to effect the polymerization while controlling the carboxylc acid/ester mol ratio within a range of 100/0-2/98, preferably 99/1-5/95.

According to the present invention, to the PGA resin after polymerization attained in the above-described manner, a carboxyl group-capping agent and a polymerization catalyst-deactivation agent are added to enhance its moisture resistance.

The carboxyl group-capping agent is understood to act on terminal carboxyl groups in the PGA resin to obstruct their hydrolysis-promoting action, thereby improving the moisture resistance of the PGA resin. As the carboxyl group-capping agent, it is generally possible to use compounds having a function of capping a carboxyl terminal and known as an agent for improving moisture resistance of aliphatic polyesters, such as polylactic acid. Examples thereof may include: carbodiimide compounds inclusive of monocarbodiimides and polycarbodiimides, such as N,N-2,6-diisopropylphenyl-carbodiimide; oxazoline compounds, such as 2,2'-m-phenylene-bis(2-oxazoline), 2,2'-p-phenylene-bis (2-oxazoline), 2-phenyl-2-oxagoline, and styrene-isopropenyl-2-oxazoline; oxazine compounds, such as 2-methoxy-5,6-dihydro-4H-1, 3-oxazine; and epoxy compounds, such as N-glycidylphthalimide, cyclohexene oxide, and tris (2,3-epoxypropyl) isocyanurate. Among these, carbodiimide compounds and epoxy compounds are preferred. Aromatic carbodiimide compounds are particularly preferred. These carboxyl group-capping agents can be used in combination of two or more species as desired, and may preferably be used in a proportion of 0.01-10 wt. parts, further preferably 0.1-2 wt. parts, particularly preferably 0.2-1 wt. part, per 100 wt. parts of the PGA resin.

In the present invention, in addition to the above-mentioned carboxyl group-capping agent, a polymerization catalyst-deactivation agent as a particular class of thermal stabilizer is added to PGA resin.

As the polymerization catalyst-deactivation agent, a compound having a deactivation function to metal-based polymerization catalysts as described before, maybe used. A so-called heavy metal-deactivating agents showing a deactivation function to heavy metal-based polymerization catalysts, such as the particularly preferred tin compounds, are preferred. Particularly, compounds meltable and compatible (i.e., mutually soluble) with PGA resin, not causing thermal decomposition but capable of forming a complex with a metal at ca. 270° C., as a temperature for melt-mixing, particularly extrusion, are preferably used. Specific examples of the polymerization catalyst-deactivation agent may include: hydrazine compounds having a —CONHNH—CO— unit, such as bis[2-(2-hydroxy-benzoyl)hydrazine] dodecanoic acid, and N,N'-bis[3-(3,5-di-t-butyl-4-hydroxyphenyl)propionyl]-hydrazine; triazole compounds, such as 3-(N-salicyloyl)amino-1,2,4-triazole; and further triazine compounds. Particularly, hydrazine compounds are preferably used because of a better formability of a complex with a metal.

It is preferred that the polymerization catalyst-deactivation agent is compatible with PGA resin in order to effectively exhibit its function of suppressing hydrolysis of glycolide. For this purpose, it is preferred that the polymerization catalyst-deactivation agent has an SP value (determined according to the Fedor method) proximate to the SP value of PGA resin, more specifically an SP value which is in a range of an SP value of PGA resin (26.8 $(J/cm^3)^{1/2}$ for PGA homopolymer) ±4 $(J/cm^3)^{1/2}$, more preferably an SP value of PGA resin ±3 $(J/cm^3)^{1/2}$.

The polymerization catalyst-deactivation agent may preferably be used in a proportion of 0.005-0.5 wt. part, particularly 0.01-0.1 wt. part, per 100 wt. parts of the PGA resin.

Below 0.005 wt. part, the moisture resistance-improving effect may be scarce and, in excess of 0.5 wt. part, the composition is liable to be colored.

To the polyglycolic acid resin composition of the present invention, it is possible to add another thermal stabilizer in additional to the above-mentioned polymerization catalyst-deactivation agent (and carboxyl group-capping agent).

As such another thermal stabilizer, it is preferred to use at least one compound selected from the group consisting of phosphoric acid esters having a pentaerythritol skeleton (or cyclic neopenta-tetra-il structure) and alkyl phosphate or phosphite esters having at least one hydroxyl group and at least one alkyl ester group (e.g., those disclosed in WO2004/087813A1). Such a thermal stabilizer may be used in a proportion of preferably 0.003-3 wt. parts, more preferably 0.005-1 wt. part, per 100 wt. parts of the aliphatic polyester resin. It is preferred that a total amount with the above-mentioned polymerization catalyst-deactivation agent is also within the ranges.

The PGA resin composition of the present invention may be obtained by melting (and mixing) the above-mentioned PGA resin, polymerization catalyst-deactivation agent (and optional another thermal stabilizer) and the carboxyl group-capping agent under heating in a temperature range of preferably 230-280° C., more preferably 240-270° C. The melting (and mixing) means may basically be any one, inclusive of a stirring machine and a continuous-type kneader, but may preferably comprise an extruder (e.g., an equi-directionally rotating twin-screw extruder) allowing a short-time processing and a smooth transfer to a subsequent cooling step for the heat-melting (and mixing) therein. If the heat-melting temperature is below 230° C., the effects of additives, such as the carboxyl group-capping agent and thermal stabilizer, are liable to be insufficient. On the other hand, in excess of 280° C., the PGA resin composition is liable to be colored.

It is possible to use a filler in order to impart a mechanical strength and other properties to the PGA resin composition. The filler is not particularly limited in species but may be in the form of fiber, plates, powder or particles. Specific examples thereof may include: fiber or whisker form fillers, such as glass fiber, PAN-based and pitch-based carbon fiber metal fiber, such as stainless steel fiber, aluminum fiber and brass fiber, natural fiber of chitin, chitosan, cellulose, cotton, etc., organic synthetic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker; and powdery, particulate and plate-like fillers of natural inorganic minerals, such as mica, talc, kaolin, silica and sand, calcium carbonate, glass beads, glass flake, glass micro-balloon, clay, molybdenum disulfide, wallastenite, montmorillonite, titanium oxide, zinc oxide, calcium polyphosphate and graphite. Any type of glass fiber can be used without particular restriction as far as it is generally usable for reinforcement of resins, and can be selected from chopped strands of long fiber type and short fiber type, and milled fiber. The above-mentioned fillers can be used in two or more species in combination. Incidentally, these fillers can be used after surface treatment thereof with known coupling agents, such as silane coupling agents and titanate coupling agents, and other surface treating agents. Further, the glass fiber can be coated or bundled with a thermoplastic resin, such as ethylene/vinyl acetate copolymer, or a thermosetting resin such as epoxy resin. The filler may be added in 0.1-100 wt. parts, preferably 1-50 wt. parts, per 100 wt. parts of the PGA resin.

EXAMPLES

Hereinbelow, the present invention will be described more specifically based on Examples and Comparative Examples. The physical properties (or values) described in the present specification including the following description are based on those measured according to the following methods.

(1) SP Value (Solubility Parameter)

Calculated according to the Fedor method (disclosed in pp. 66-67 of Hideki YAMAMO, "SP Value: Basic, Application and Calculation Method", (published from K.K. Jouhou Kikoh (2006)). More specifically, an SP value $\delta$ ($(J/cm^3)^{1/2}$) of an objective compound was calculated according to the following formula: $\delta = \Sigma\ Ecoh/\Sigma V)^{1/2}$, wherein $\Sigma$ Ecoh denotes a total of Ecoh (cohesion energies (J) of components of the objective compound) and $\Sigma$ V denotes a total of V (molar volumes ($cm^3$) of the components of the objective compounds). For example, the SP value of PGA homopolymer (recurring unit: —($O.CH_2.CO$)—) was calculated by using Ecoh values (O: 3350J, $CH_2$: 4940J, CO: 13730J) and V values (0: 3.8 $cm^3$, $CH_2$: 16.1 $cm^3$, CO: 10.8 $cm^3$) proposed by Fedor in the following manner:

$$\delta = \{(3350 + 4940 + 13730)/(3.8 + 16.1 + 10.8)\}^{1/2}$$
$$= 26.8 (J/cm^3)^{1/2}$$

(2) Glycolide Content

To ca. 100 mg of a sample PGA resin (composition), 2 g of dimethyl sulfoxide containing 4-chlorobenzophenone as an internal standard at a concentration of 0.2 g/l, was added, and the mixture was heated at 150° C. for ca. 5 min. to dissolve the resin and, after being cooled to room temperature, was subjected to filtration. Then, 1 μl of the filtrate solution was taken and injected into a gas chromatography (GC) apparatus for measurement. From a value obtained from the measurement, a glycolide content was calculated in terms of wt. % contained in the polymer. The GC analysis conditions were as follows.

Apparatus: "GC-2010" made by K.K. Shimadzu Seisakusho) Column: "TC-17" (0.25 mm in diameter×30 mm in length).

Column temperature: Held at 150° C. for 5 min., heated at 270° C. at a rate of 20° C./min. and then held at 270° C. for 3 min.

Gasification chamber temperature: 180° C.

Detector: FID (hydrogen flame ionization detector) at temperature of 300° C.

(3) Molecular Weight Measurement

Ca. 1 g of a pellet sample was sandwiched between aluminum sheets and heated for 3 minutes on a heat press machine at 260° C. Then, the sample was held for ca. 5 minutes under a pressure of 5 MPa and then immediately transferred to a press machine cooled with circulating water to form a transparent amorphous press sheet. The thus-prepared press sheet in the state of being sandwiched with aluminum sheets was heat-treated for 10 min. at 80° C. The thus-heat-treated press sheet is referred to as a crystalline unstretched sheet.

From the above-prepared press sheet, ca. 10 mg of a sample was cut out and was dissolved in 10 ml of hexafluoroisopropanol (HFIP) containing sodium trifluoroacetate dissolved therein at 5 mM. Then, 20 μl of the resultant sample solution was filtrated through a 0.1 μm-membrane filter made of polytetrafluoroethylene and then injected into a gel permeation chromatography (GPC) apparatus for measurement of molecular weight under the following conditions. Incidentally, the sample was injected into the GPC apparatus within 30 minute after the dissolution.

<GPC Measurement Conditions>

Apparatus: "Shodex-104" made by Showa Denko K.K.
Column: Two columns of "HFIP-606M" were connected in series with 1 column of "HFIP-G" as a pre-column.
Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using 5 species of standard polymethyl methacrylate having different molecular weights.

(4) Terminal Carboxyl Group Concentration

From a press sheet prepared in the same manner as a sample for molecular weight measurement, a sample was cut, accurately weighed at ca. 0.3 g and completely dissolved in 10 ml of dimethyl sulfoxide of a reagent grade on an oil bath at 150° C. for ca. 3 min. Two drops of an indicator (0.1 wt. % Bromothymol Blue/methyl alcohol solution) was added, and further a 0.02 normal-sodium hydroxide/benzyl alcohol solution was gradually added thereto until a termination point where the color of the solution changed from yellow to green by observation with eyes. From the amount of the dropped sodium hydroxide solution, a carboxyl group concentration was calculated in terms of equivalents per t (ton) of PGA resin.

(5) Moisture Resistance (Molecular Weight-Retentivity)

Ca. 10 mg of a sample was cut out from the press sheet (crystalline unstretched sheet) prepared in the same manner as a sample for molecular weight measurement and held for 3 days in a constant temperature and humidity chamber held at a temperature of 50° C. and relative humidity of 90%. The sample was taken out after the 3 days and measured with respect to a molecular weight by gel permeation chromatography (GPC). A molecular weight retentivity was calculated from the measured molecular weight and a molecular weight of sample before being placed in the constant temperature and humidity chamber, and a moisture resistance was evaluated based on the molecular weight retentivity. The molecular weight-retentivity is preferably at least 75%, more preferably at least 80%, further preferably 85% or more, while it can depend on the manner of use of the PGA resin composition.

Example 1

Into a hermetically closable SUS-made vessel equipped with a steam jacket structure and a stirrer, 450 kg of glycolide (made by Kureha Corporation; containing 360 ppm of glycolic acid dimer and 13 ppm of water) and 1600 g of dodecyl alcohol were added, then 13.5 g (30 ppm) of tin dichloride dihydrate was added and, after closing the vessel, steam was circulated in the jacket to heat the contents up to a temperature of 100° C., thereby forming a uniform liquid. While keeping the temperature at 100° C., the contents were transferred to an apparatus comprising metal (SUS304)-made tubes having an inner diameter of 28 mm. Immediately after completing the transfer of the glycolide into the tubes, an upper plate was affixed. The body part was held for 7 hours under circulation of a heat medium oil at 170° C., and lumps of polyglycolic acid (PGA) were obtained and pulverized by a pulverizer.

The thus-obtained PGA pulverizate was placed in a drier into which dry air with a dew point of −50° C. was blown to effect 12 hours of drying at 120° C. Moisture content after the drying was 42 ppm.

To the thus-obtained dry PGA pulverizate (SP value: 26.8 $(J/cm^3)^{1/2}$), 300 ppm of bis[2-(2-hydroxybenzoyl)hydrazine] dodecanoic acid (SP value: 29.7 $(J/cm^3)^{1/2}$); trade name: "ADEKA STAB CDA-6", made by Asahi Denka Kogyo K.K.) as a compatible polymerization catalyst-deactivation agent and 0.5 wt. % of N,N-2,6-diisopropylphenylcarbodiimide as a carboxyl group-capping agent (CDI) (made by Kawaguchi Kogyo K.K.), respectively based on PGA, were added and extruded through a twin-screw extruder under the following conditions to obtain PGA pellets.

(Extrusion Conditions)

Extruder: "TEM-41SS", made by Toshiba Kikai K.K. Temperature set conditions: The temperatures of zones C1-C10 and a die from the feed port to the discharge port were sequentially set to 200° C., 230° C., 260° C., 270° C., 270° C., 270° C., 270° C., 250° C., 240° C., 230° C. and 230° C. (die).

Comparative Example 1

PGA pellets were prepared in the same manner as in Example 1 except for adding 300 ppm based on PGA of a nearly equi-molar mixture of mono- and di-stearyl acid phosphate ("AX-71", made by Asahi Denka Kogyo K.K.) as a thermal stabilizer instead of the polymerization catalyst-deactivation agent (CDA-6).

Comparative Example 2

PGA pellets were prepared in the same manner as in Example 1 except for omitting the carboxyl group-capping agent (CDI).

The PGA pellets obtained in the above Example and Comparative Examples were respectively subjected to measurement of initial carboxyl group concentration, glycolide contents and molecular weights at the initial. stage and after 3 days of standing in a moisture resistance evaluation environment (50° C., 90%-relative humidity), and also molecular weight-retentivities were calculated. The results are inclusively shown in Table 1 below together with the outlines of the respective compositions.

TABLE 1

| | | Example 1 | Comparative Example 1 | Comparative Example 2 |
|---|---|---|---|---|
| Thermal stabilizer | | Polymn. Catalyst deactivator *[1] | Alkyl phosphate *[2] | Polymn. Catalyst deactivator *[1] |
| Amount | (ppm) | 300 | 300 | 300 |
| Carboxyl group-capping agent | | CDI *[3] | CDI *[3] | none |
| Amount | (wt %) | 0.5 | 0.5 | — |

TABLE 1-continued

|  |  | Example 1 | Comparative Example 1 | Comparative Example 2 |
|---|---|---|---|---|
| Carboxyl group concentration | (eq/t) | 1 | 1 | 16 |
| Glycolide content (initial) | (wt %) | 0.16 | 0.13 | 0.13 |
| Glycolide content (after 3 days) | (wt %) | 0.13 | 0.03 | 0.10 |
| Molecular weight (initial) | ($\times 10^4$) | 21.5 | 20.6 | 21.2 |
| Molecular weight (after 3 days) | ($\times 10^4$) | 19.2 | 11.8 | 9.3 |
| Molecular weight-retentivity | (%) | 89 | 57 | 44 |

*1 Bis [2-(2-hydroxybenzoyl)hydrazine] decanoic acid
*2 Nearly equi-molar mixture of mono- and di-stearyl acid phosphate
*3 N,N-2,6-diisopropyl phenylcarbodiimide In view of the results shown in Table 1, it is understood that the PGA resin composition obtained in Example 1 by adding a polymerization catalyst-deactivation agent and a carboxyl group-capping agent in combination exhibited a remarkably good moisture resistance (molecular weight retentivity after 3 days of standing in a high temperature-high humidity environment of 50° C. and 90%). In contrast thereto, Comparative Example 1 using an alkyl phosphate-type thermal stabilizer instead of a polymerization catalyst-deactivation agent as a thermal stabilizer and Comparative Example 2 having omitted the carboxyl group-capping agent, both resulted in lower moisture resistance. It is particularly noted that, in Example 1, the amounts of glycolide usually functioning as a carboxyl group source through hydrolysis were high both at the initial stage and after 3 days, whereas the moisture resistance was well retained. In comparison with Comparative Example 1 wherein the glycolide content after 3 days was reduced to result in a lower moisture resistance, it is considered that the hydrolysis of the glycolide content was suppressed by the presence of the polymerization catalyst-deactivation agent, whereby the function thereof as a carboxyl group source was obstructed.

Industrial Applicability

As described above, according to the present invention, a polymerization catalyst-deactivation agent and a carboxyl group-capping agent are added in combination to polyglycolic acid resin, thereby providing a polyglycolic acid resin composition with a remarkably improved moisture resistance.

The invention claimed is:

1. A polyglycolic acid resin composition with improved moisture resistance, comprising: a polyglycolic acid resin, a carboxyl group-capping agent, and a polymerization catalyst-deactivation agent selected from the group consisting of hydrazine compounds having a CONHNH—CO— unit, wherein:
the polyglycolic acid resin composition exhibits a molecular weight-retentivity of at least 75% after 3 days of standing in an environment of 50° C. and 90%-relative humidity, in its crystalline unstretched sheet state.

2. The polyglycolic acid resin composition according to claim 1, wherein the polymerization catalyst-deactivation agent is compatible with the polyglycolic acid resin.

3. The polyglycolic acid resin composition according to claim 2, wherein the polymerization catalyst-deactivation agent has an SP value (according to the Fedor method) within a range of an SP value of the polyglycolic acid resin ±4 $(J/cm^3)^{1/2}$.

4. The polyglycolic acid resin composition according to claim 1, wherein the polymerization catalyst-deactivation agent is added in an amount of 0.005-0.5 wt. part per 100 wt. parts of the polyglycolic acid resin.

5. The polyglycolic acid resin composition according to claim 1, wherein the carboxyl group-capping agent is a carbodiimide compound.

6. The polyglycolic acid resin composition according to claim 1, wherein the carboxyl group-capping agent is added in an amount of 0.01-10 wt. parts per 100 wt. parts of the polyglycolic acid resin.

7. The polyglycolic acid resin composition according to claim 1, further comprising another thermal stabilizer in addition to the polymerization catalyst-deactivation agent.

8. The polyglycolic acid resin composition according to claim 7, wherein said another thermal stabilizer is at least one compound selected from the group consisting of phosphoric acid esters having a pentaerythritol skeleton, alkyl phosphate esters having at least one hydroxyl group and at least one alkyl ester group, and phosphite esters having at least one hydroxyl group and at least one alkyl ester group.

9. The polyglycolic acid resin composition according to claim 1, exhibiting a molecular weight-retentivity of at least 80% after 3 days of standing in an environment of 50° C. and 90%-relative humidity, in its crystalline unstretched sheet state.

10. The polyglycolic acid resin composition according to claim 1, exhibiting a molecular weight-retentivity of at least 85% after 3 days of standing in an environment of 50° C. and 90%-relative humidity, in its crystalline unstretched sheet state.

* * * * *